United States Patent
Ghisolfi et al.

(10) Patent No.: US 8,613,458 B2
(45) Date of Patent: Dec. 24, 2013

(54) EXTENSIBLE TWO-WHEELED VEHICLE

(76) Inventors: Richard Ghisolfi, Villeurbanne (FR);
Alain Ghisolfi, Villeurbanne (FR)

( * ) Notice: Subject to any disclaimer, the term of this patent is extended or adjusted under 35 U.S.C. 154(b) by 0 days.

(21) Appl. No.: 13/575,985

(22) PCT Filed: Jan. 31, 2011

(86) PCT No.: PCT/IB2011/050423
§ 371 (c)(1),
(2), (4) Date: Jul. 30, 2012

(87) PCT Pub. No.: WO2011/095931
PCT Pub. Date: Aug. 11, 2011

(65) Prior Publication Data
US 2012/0292882 A1 Nov. 22, 2012

(30) Foreign Application Priority Data

Feb. 2, 2010 (FR) ...................... 10 50715

(51) Int. Cl.
*B62M 1/00* (2010.01)
(52) U.S. Cl.
USPC ................ 280/87.05; 280/87.041; 280/87.01
(58) Field of Classification Search
USPC ............... 280/87.01, 87.021, 87.041, 87.042, 280/87.05, 63, 47.17, 47.371
See application file for complete search history.

(56) References Cited

U.S. PATENT DOCUMENTS

| | | | | |
|---|---|---|---|---|
| 5,709,400 A * | 1/1998 | Bonnier et al. | ............... | 280/650 |
| 6,460,866 B1 * | 10/2002 | Altschul et al. | ................ | 280/30 |
| 7,029,015 B2 * | 4/2006 | Lin | ............................ | 280/47.26 |
| 7,367,572 B2 * | 5/2008 | Jiang | ........................ | 280/87.042 |
| 7,431,311 B2 * | 10/2008 | Turner et al. | .................... | 280/30 |
| 7,600,768 B2 * | 10/2009 | Chen et al. | ................ | 280/87.042 |
| 7,669,862 B2 * | 3/2010 | Kamara et al. | ............... | 280/5.26 |
| 7,837,206 B1 * | 11/2010 | Lee | ................. | 280/37 |
| 8,282,113 B2 * | 10/2012 | Veal et al. | ................ | 280/87.041 |
| 2004/0094919 A1 * | 5/2004 | Roder et al. | .................... | 280/30 |
| 2010/0213680 A1 * | 8/2010 | Massara et al. | .......... | 280/87.041 |
| 2012/0018968 A1 * | 1/2012 | Joslin et al. | ............. | 280/87.041 |

FOREIGN PATENT DOCUMENTS

| | | |
|---|---|---|
| DE | 10045821 A1 | 3/2002 |
| DE | 10204478 A1 | 8/2003 |
| FR | 2822794 A1 | 10/2002 |
| WO | WO 0246032 A1 | 6/2002 |
| WO | WO 03/093093 A1 | 11/2003 |

* cited by examiner

*Primary Examiner* — J. Allen Shriver, II
*Assistant Examiner* — Travis Coolman
(74) *Attorney, Agent, or Firm* — Defillo & Associates, Inc.; Evelyn A. Defillo

(57) ABSTRACT

The vehicle includes a platform (2) made from two parts, a front part (10) and a rear part (11) that is movable in relation to the front part (10) between a folded position and an unfolded position. A steering column (20) includes a lower part (50) and at least one upper part (51) that can be unfolded and folded telescopically in relation to the lower part (50). A transmission (12) between the front part (10) of the platform and the upper part (51) of the steering column (20), arranged so that unfolding the rear part (11) of the platform causes the upper part (51) of the steering column (20) to unfold and, conversely.

8 Claims, 11 Drawing Sheets

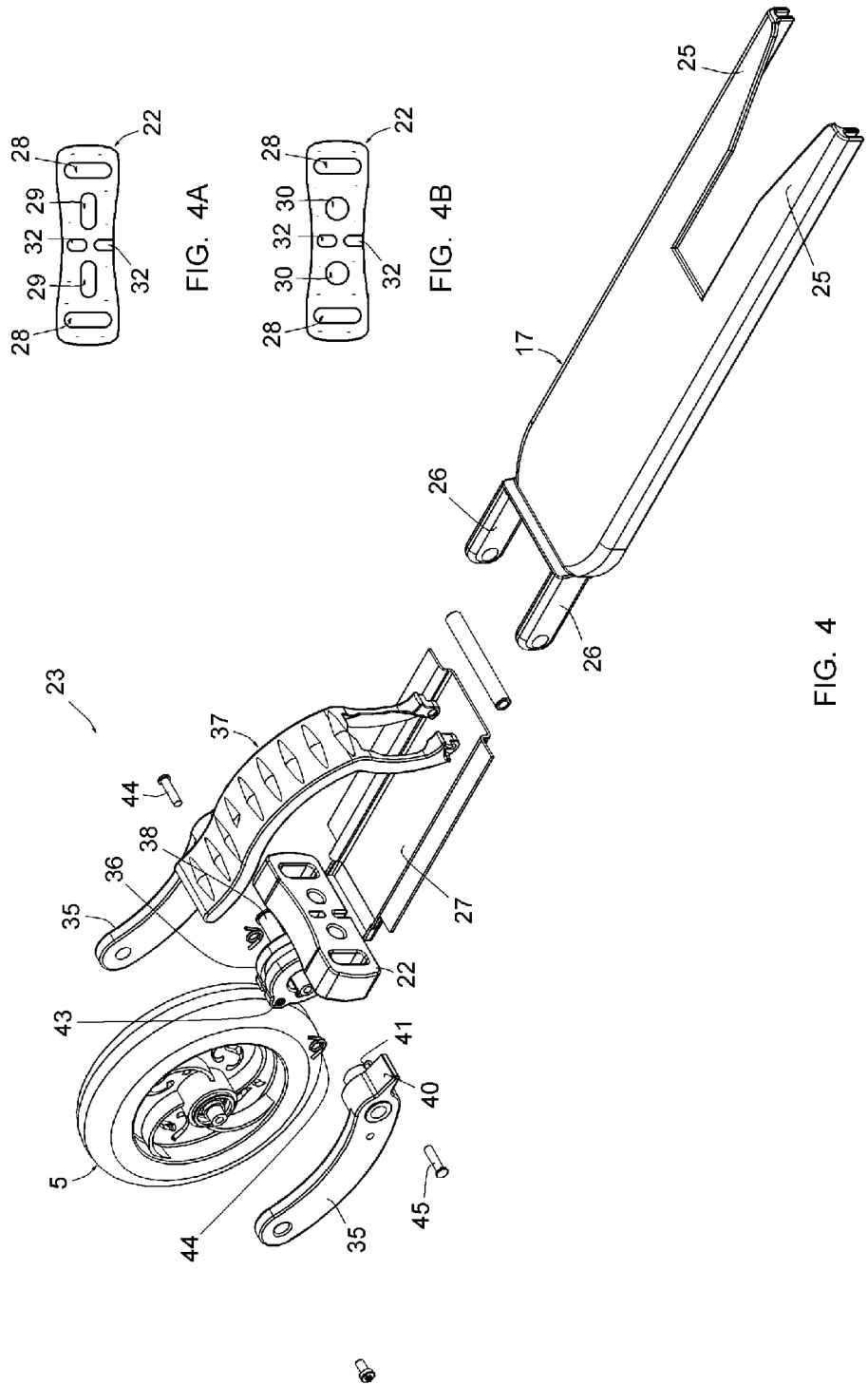

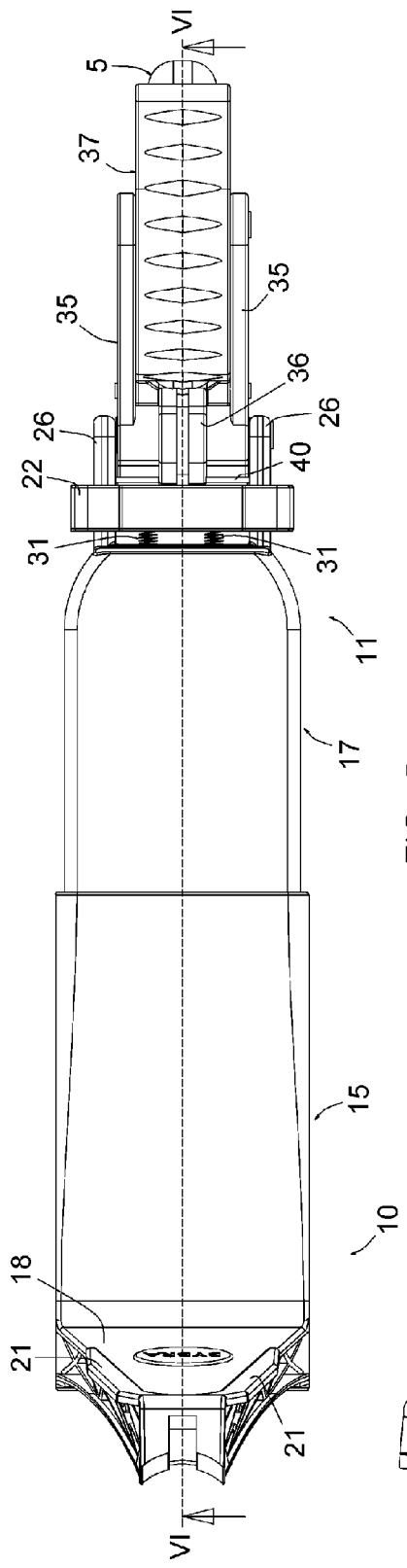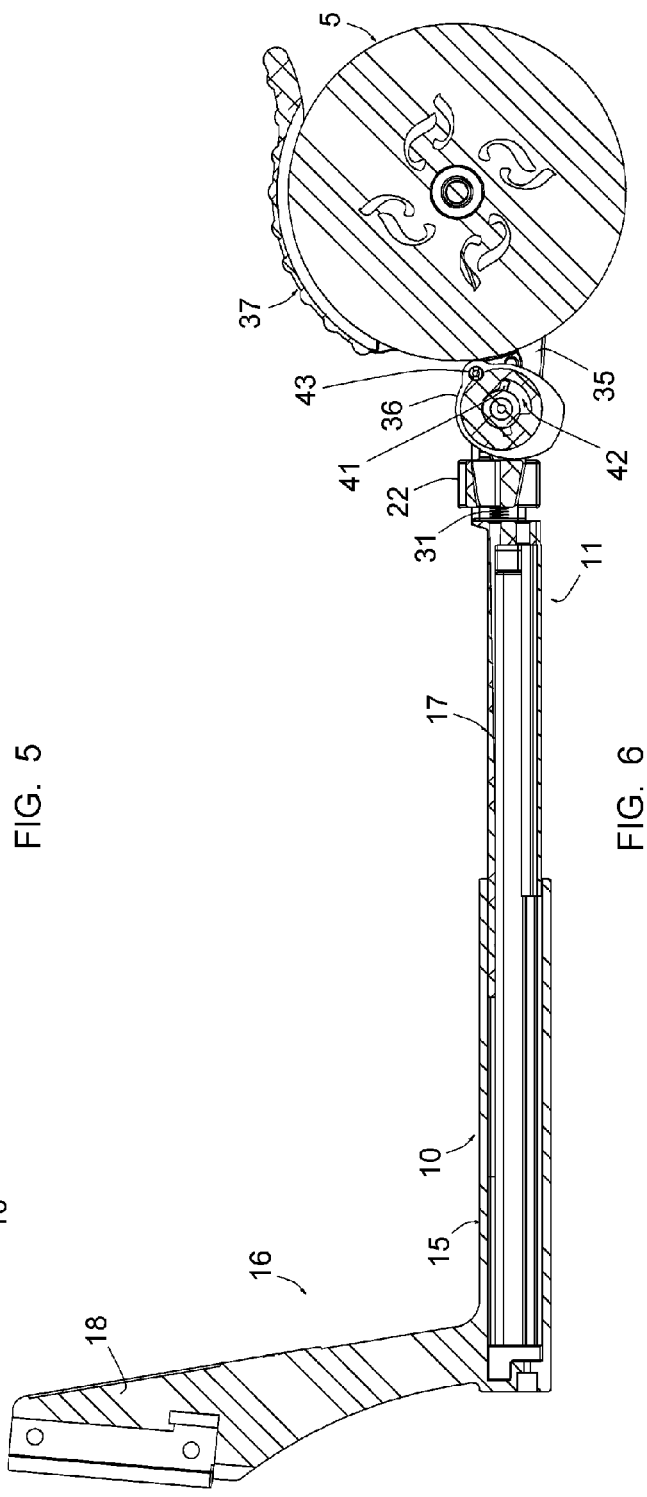

EXTENSIBLE TWO-WHEELED VEHICLE

CROSS REFERENCE TO RELATED APPLICATION

This application is a national stage entry of PCT/IB2011/050423 filed Jan. 31, 2011, under the International Convention claiming priority over French Application No. 1050715 filed Feb. 2, 2010.

FIELD OF THE INVENTION

The present invention relates to a foldable two-wheel vehicle.

BACKGROUND OF THE INVENTION

It is known to design foldable two-wheel vehicles. The bulk of such vehicles in the folded state nevertheless remains significant, which is a major drawback in certain situations, for example to take public transportation, travel, or attend certain events or demonstrations. Furthermore, the manipulations necessary to unfold the vehicle are not always very easy.

OBJECTS OF THE INVENTION

The primary aim of the present invention is to resolve the drawbacks of the existing vehicles, by providing a foldable two-wheel vehicle that can be folded into a small volume and is easy to manipulate.

Furthermore, to date there is no container well-suited to transporting a folding two-wheel vehicle, and transporting objects using such a vehicle is not easy with the existing vehicles.

The present invention also aims to resolve these drawbacks, by providing an assembly including a folding two-wheel vehicle and a container allowing an advantageous combination of that vehicle and that container.

SUMMARY OF THE INVENTION

The two-wheel vehicle according to the invention comprises a platform on which a user may position himself, a steering assembly comprising a steering column situated at the front of the platform, and a rear wheel situated at the rear of the platform.

According to the invention,
the platform is made from two parts, i.e. a front part and a rear part that is movable in relation to the front part, said rear part being movable between a folded position, in which it is retracted in relation to the front part, and an unfolded position, in which it is situated in the extension of the front part;
the steering column comprises a lower part and at least one upper part that can be unfolded and folded telescopically in relation to the lower part; and
the vehicle includes a transmission between said front part of the platform and said upper part of the steering column, arranged so that unfolding the rear part of the platform causes the upper part of the steering column to unfold and, conversely, folding the upper part of the steering column causes the rear part of the platform to be folded.

The vehicle according to the invention thus has a reduced volume in the folded state, allowing it to be transported easily. It is also able to go from its unfolded state to its folded state, and vice versa, very easily.

Preferably, the rear part of the platform comprises a pivoting rear assembly on which the rear wheel of the vehicle is mounted, said assembly being movable between a folded position, in which it is folded down on the side of the rear part, and an unfolded position, in which it is positioned substantially in the extension of said rear part, the folding and unfolding positions of this assembly respectively corresponding to the folding and unfolding positions of the vehicle.

This pivoting rear assembly makes it possible, in the folded position, to further increase the compactness of the vehicle in that position.

According to one preferred embodiment of the invention:
the pivoting rear assembly comprises two arms pivotably mounted on two branches secured to said rear part of the platform; the rear wheel is mounted between those two arms, on the side of the rear ends thereof, and said arms include locking extensions on the side of their front ends;
said branches include a locking part slidingly mounted thereon, comprising two cavities capable of receiving said locking extensions in the unfolded position of the pivoting rear assembly, said locking part being biased in a locking position by elastic means; the locking part is longitudinally movable on said branches between the locked position, in which it can receive said locking extensions in said cavities, thereby locking the pivoting rear assembly in the unfolded position, and a retracted position, in which it frees said locking extensions of said cavities and thus does not hinder the pivoting of said arms;
the pivoting rear assembly comprises a control member of the locking part, actuated by said transmission.

Preferably, said control member of the locking part is a pivoting cam, not pivotably connected to the arms on a first sector of the pivoting movement, and pivotably connected to said arms on a second sector of the pivoting movement, said second sector being adjacent to the first sector; this cam is configured so as, during its pivoting movement on said first sector, to actuate the locking part from its locking position toward its retracted position, and, during its pivoting movement on said second sector, to pivot said arms.

The pivoting of the cam on said first sector is therefore a pivoting actuating a locking part, while the pivoting of the cam on said second sector is a pivoting that pivots the arms.

Preferably, said transmission comprises a cable connected to said front part of the vehicle, a first part of which extends along the front and rear parts of the platform, passes over said pivoting cam and is fixed thereto, and whereof a second part extends, from the fastening point of the cable on the cam, again along the front and rear portions of the platform, then penetrates the steering column, is engaged on an upper pulley included by said lower part of said steering column, then is connected to the lower part of said upper part of said steering column; from the folded position of the vehicle, the movement of said rear part of the platform in relation to said front part of the platform toward its unfolded position first exerts a pulling force on said first part of the cable, causing the cam to pivot on said first sector, then, once the cam arrives in said second sector, causes the rear pivoting assembly to pivot; once the cam arrives in said second sector, the movement of said rear part of the platform also exerts a pulling force on said second part of the cable, thereby performing the telescoping unfolding of the upper part of the steering column in relation to the lower part thereof.

Conversely, from the unfolded position of the vehicle, pressure on said upper part of the steering column exerts a pulling force on said second part of the cable, which causes the cam to pivot on said first sector of the movement of that cam, which actuates the locking part in the retracted position, and therefore the unlocking of the pivoting of the rear pivoting assembly, and simultaneously the movement of said rear part of the platform in the folded position in relation to said front part of the platform.

The vehicle may comprise a manually deployable portion of the steering column, in particular the portion of the steering column that is connected to the handle bars.

Advantageously, the vehicle comprises handlebars made up of a tube perpendicularly connected to the steering column, said handlebars comprising a stationary part and a moving part, which can be unfolded and folded in relation to said stationary part.

This possibility of unfolding/folding the handle bars also makes it possible to achieve greater compactness.

The invention also relates to the assembly made up of:
the aforementioned vehicle, which also comprises a first mounting part making it possible to mount it on a container, in particular of the backpack or saddlebag type, and
said container, which comprises a second mounting part, capable of cooperating with said first mounting part to allow said container to be mounted on the vehicle.

According to one preferred embodiment of the invention, in that case:
the vehicle comprises an extension secured to the front of the platform, and said first mounting part is formed on that extension, and
the container comprises long sides and short sides, and said second mounting part is arranged at the lower part of one of the long sides of the container, substantially at the center of the long side,
the container thus being able to be mounted on the vehicle with its long sides extending transversely to the front-back plane of the vehicle.

Balanced positioning of the container on the vehicle is thus achieved, and the container encroaches on the platform little or not at all.

Preferably, the container comprises a compartment capable of receiving the vehicle in the folded position.

The vehicle can thus be easily stored in the container for transport thereof.

The invention will be well understood, and other features and advantages thereof will appear, in reference to the appended diagrammatic drawing, showing, as a non-limiting example, one preferred embodiment of the vehicle to which it relates.

BRIEF DESCRIPTION OF THE DRAWINGS

FIG. 4 is an exploded perspective view of a pivoting rear assembly that it comprises;

FIG. 4A is a front view of a locking part comprised by the vehicle, by the surface of the locking part turned toward the rear of the vehicle;

FIG. 4B is a front view of said locking part, by the surface of the locking part turned toward the front of the vehicle;

FIG. 5 is a partial top view of the vehicle;

FIG. 6 is a cross-sectional side view along the median line VI-VI of FIG. 5, said transmission cable not being shown;

DESCRIPTION OF THE PREFERRED EMBODIMENT

Figure 1:
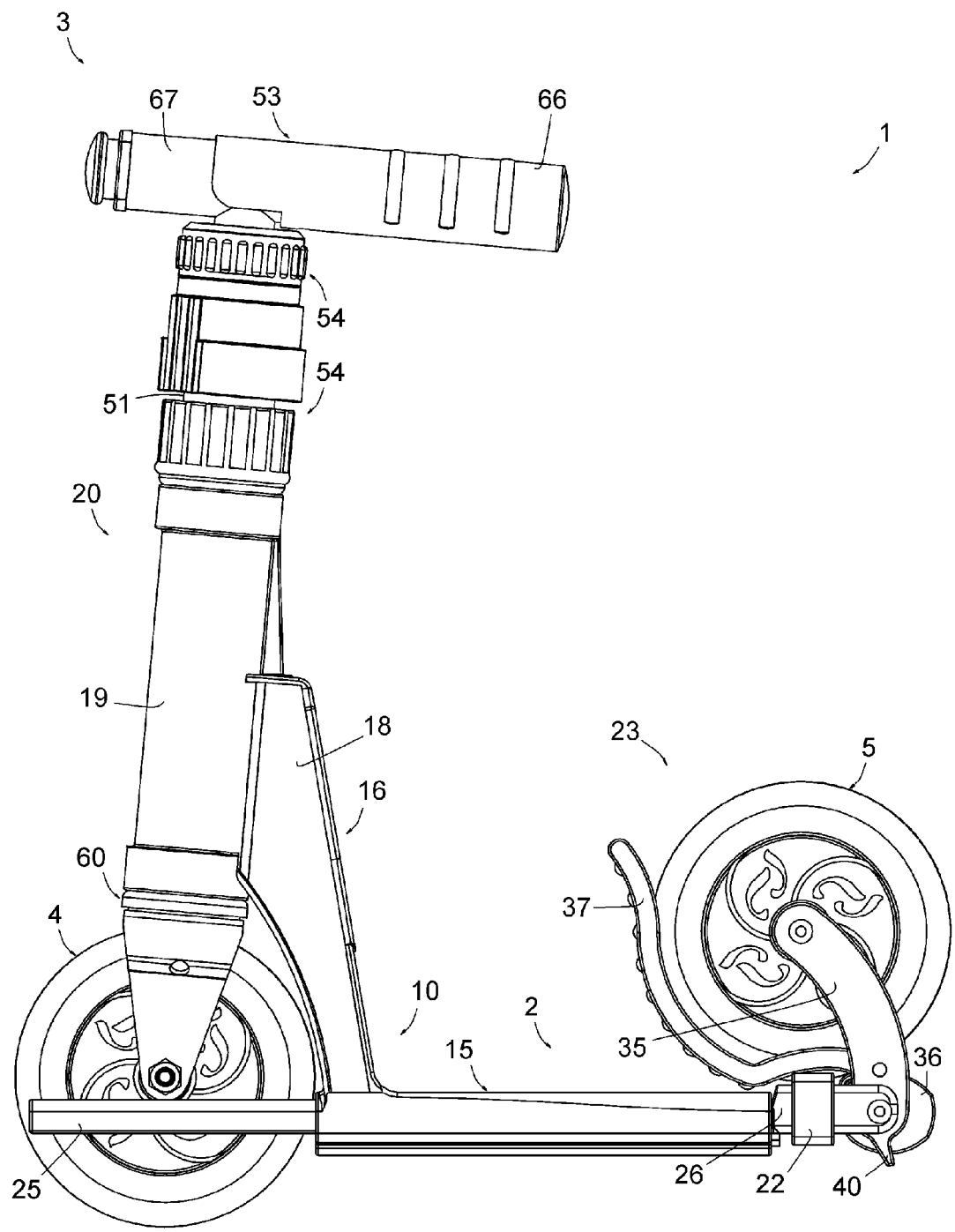
FIG. 1 is a side view, in a completely folded position.
Figures 2, 2A:
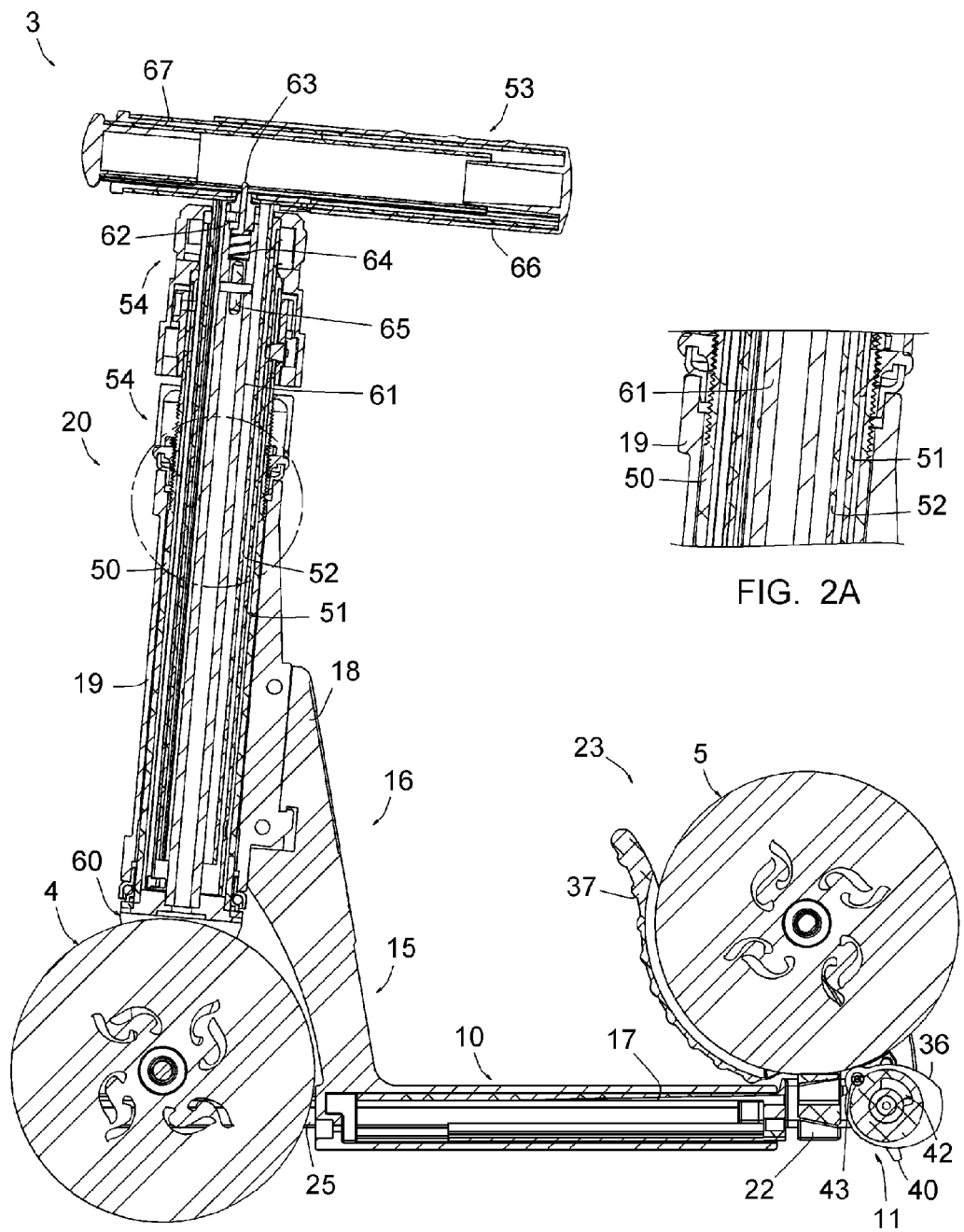
FIG. 2 is a view similar to FIG. 1, in longitudinal cross-section; a transmission cable comprised by the vehicle has been omitted, for clarity of the drawing.
FIG. 2A is an enlarged view of the detail circled in FIG. 2.
Figures 3, 3A:
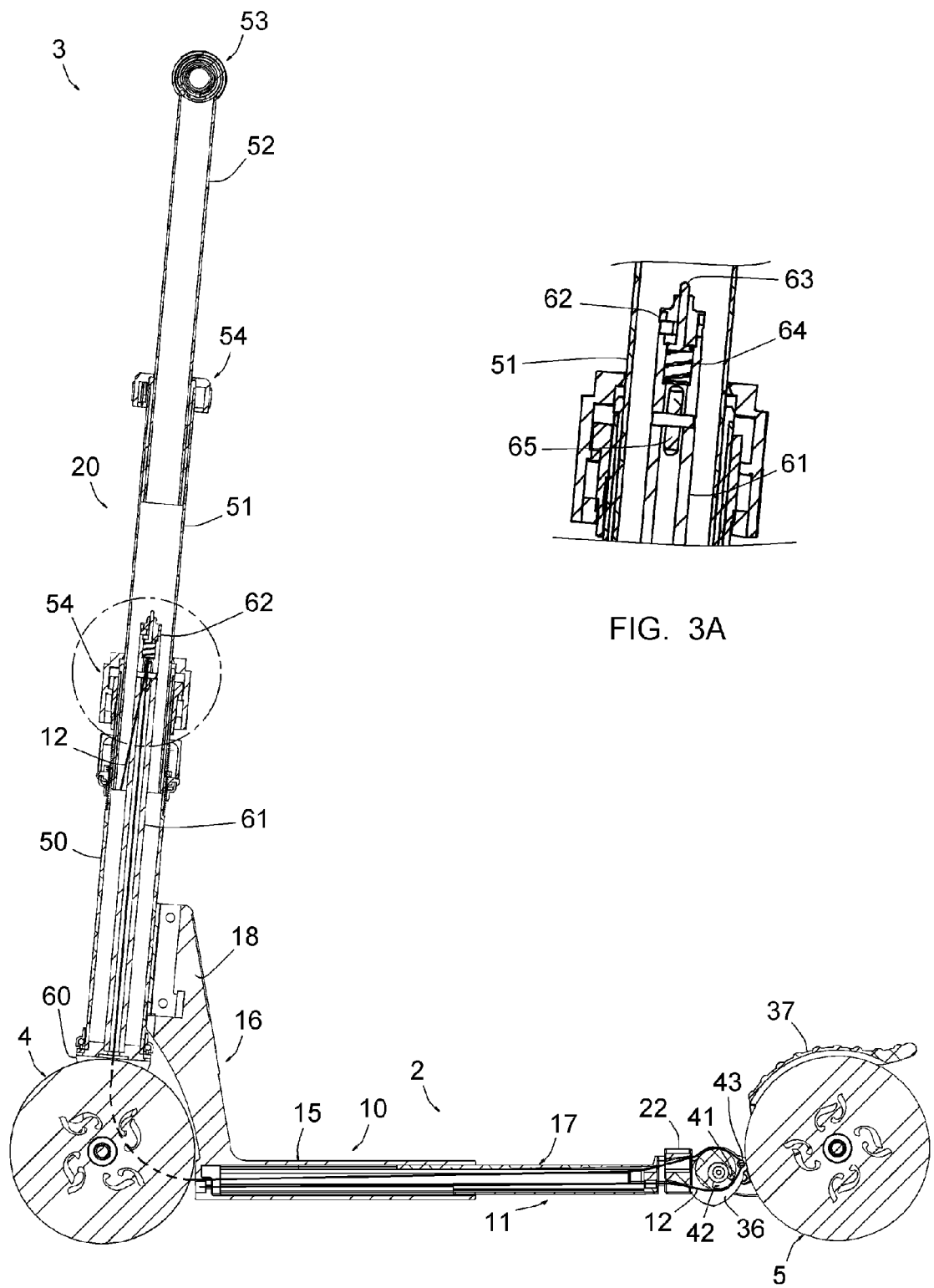
FIG. 3 is a view similar to FIG. 2, in the completely unfolded state, said transmission cable being shown; a steering tube comprised by the vehicle has been omitted from this view, for clarity.
FIG. 3A is an enlarged view of the detail circled in FIG. 3.
Figure 7:
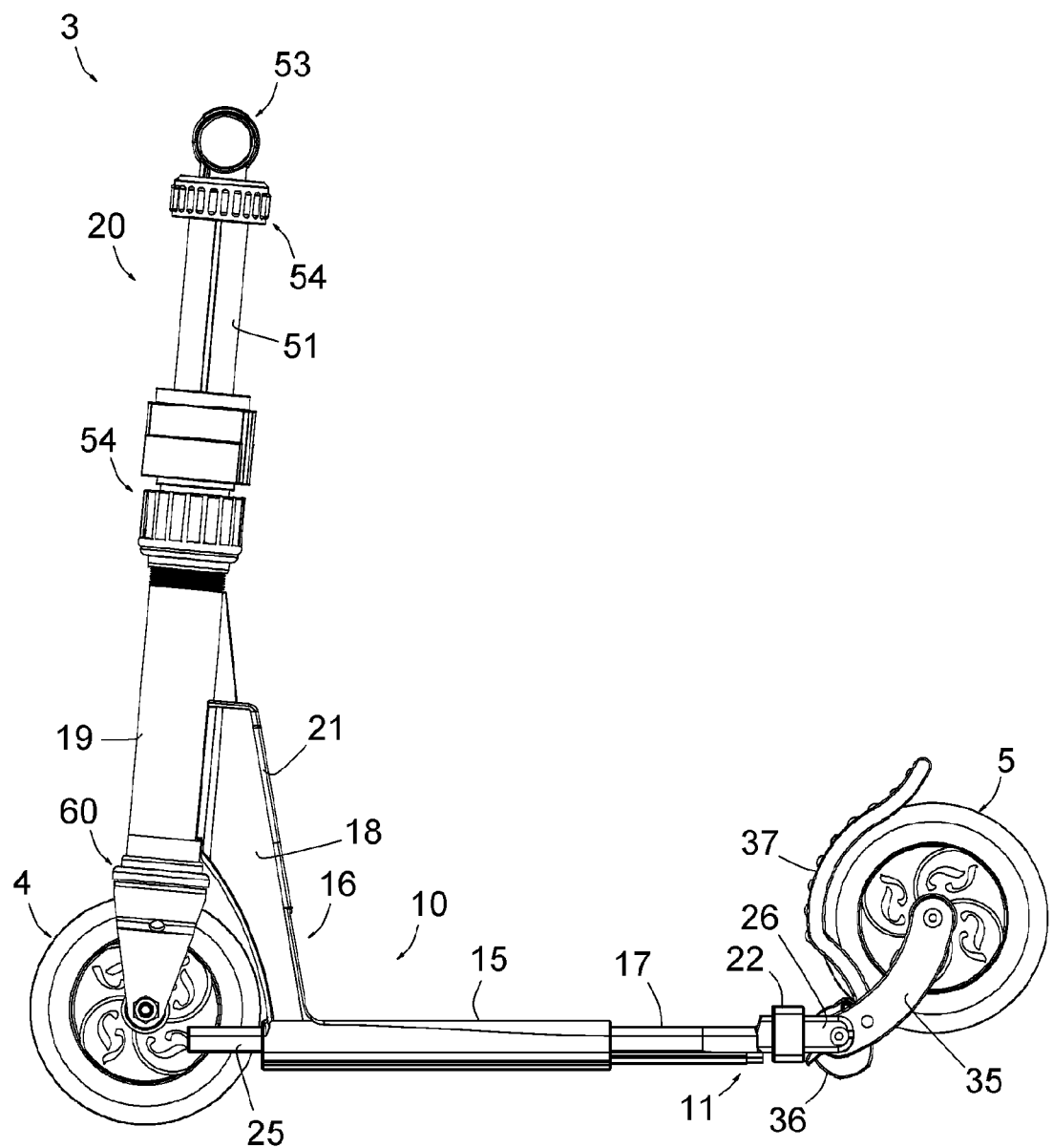
FIGS. 7 to 9 are side views, in a first intermediate unfolded position, a second intermediate unfolded position, and a completely unfolded position, respectively.
Figure 8:
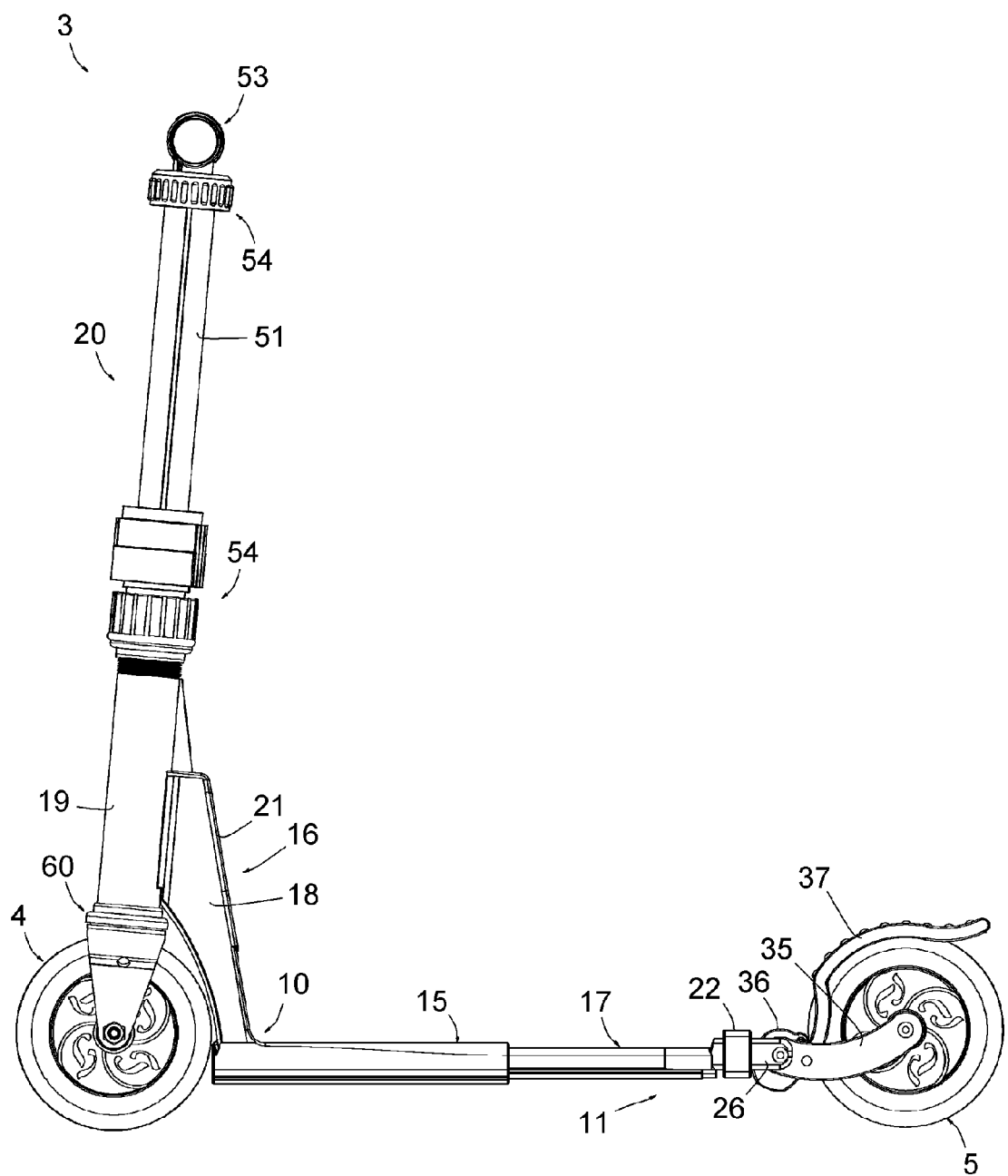
Figure 9:
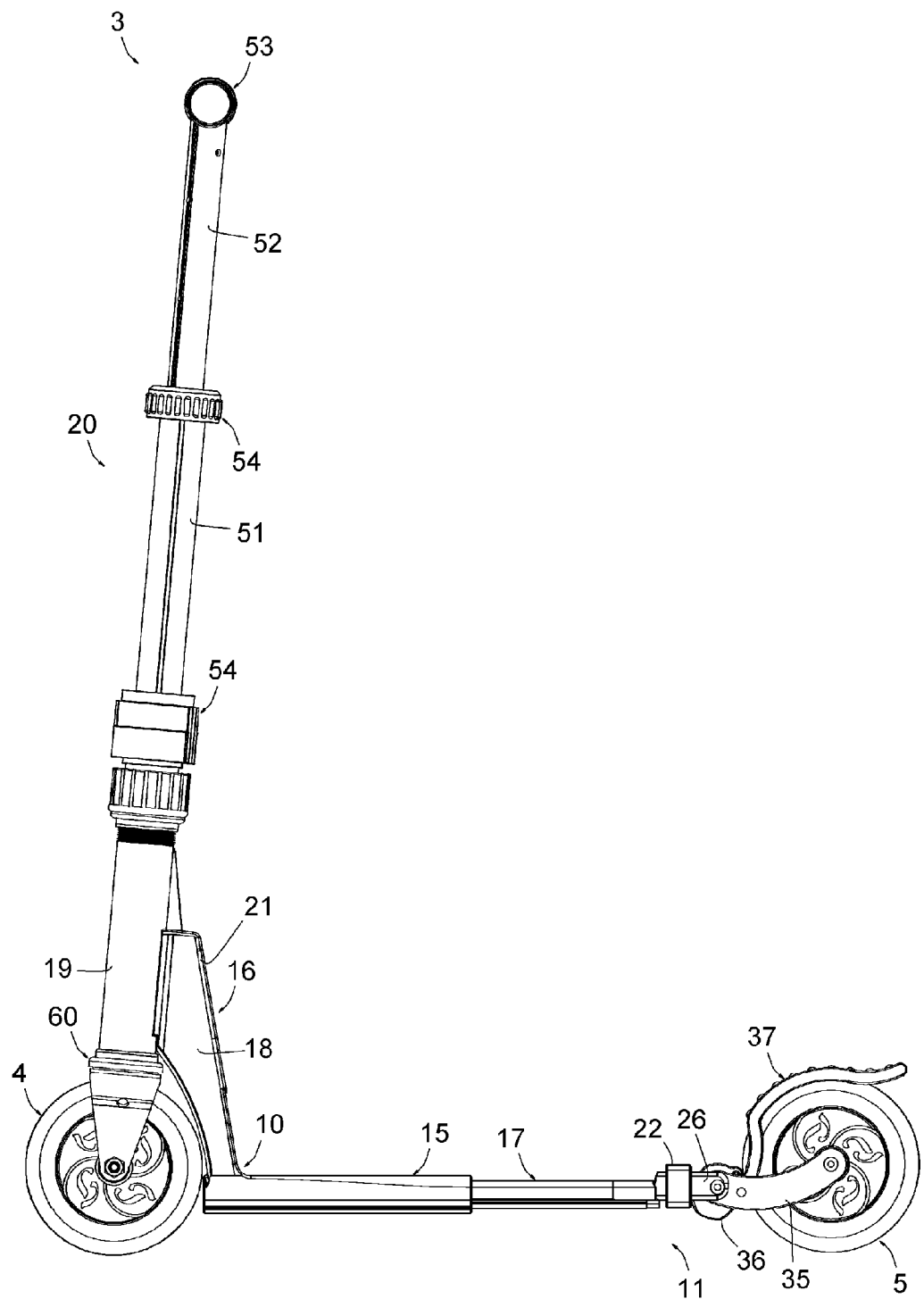

FIGS. 1 to 9 and 12 show a foldable two-wheel vehicle 1, of the scooter type, able to adopt the configuration shown in FIGS. 1 and 2 in the completely folded position, and the configuration shown in FIGS. 3 and 9 in the completely unfolded position.

This vehicle 1 comprises a platform 2 on which a user may be positioned, a steering assembly 3 for a front wheel 4, situated at the front of the platform 2, and a rear wheel 5 situated at the rear of the platform 2.

As understood by comparing these figures, the vehicle 1 includes a front assembly 10 and a rear assembly 11 that slides in relation to the front assembly 10, and the steering assembly 3 comprises a telescopically deployable tube 51. It also comprises a cable 12 (cf. FIG. 3) forming a transmission that makes it possible to coordinate the unfolding and folding movements of the front 10 and rear 11 assemblies with the unfolding and folding movements of the tube 51 of the steering assembly 3.

The front assembly 10 comprises a front platform part 15 and a steering extension 16.

The front platform part 15 is inwardly hollow and slidingly receives a rear platform part 17 therein that is part of the rear assembly 11. This rear part 17 can be moved between the folded position (cf. FIGS. 1 and 2), in which it is retracted inside the front part 15, and an unfolded position, in which it protrudes from that front part 15, while being situated in the extension thereof. Elastic means (not shown in the figures for clarity), in particular a cylinder or one or several springs, are inserted between the front part 15 and the rear part 17, biasing the latter in said unfolded position.

The extension 16 comprises a foot 18 secured to the front part 15 and a tube 19 forming the guide bearing for the pivoting of the steering column 20 comprised by the steering assembly 3. The tube 19 comprises a rear longitudinal rib forming a lower hook, using which it can be attached to the foot 18.

Figure 10:
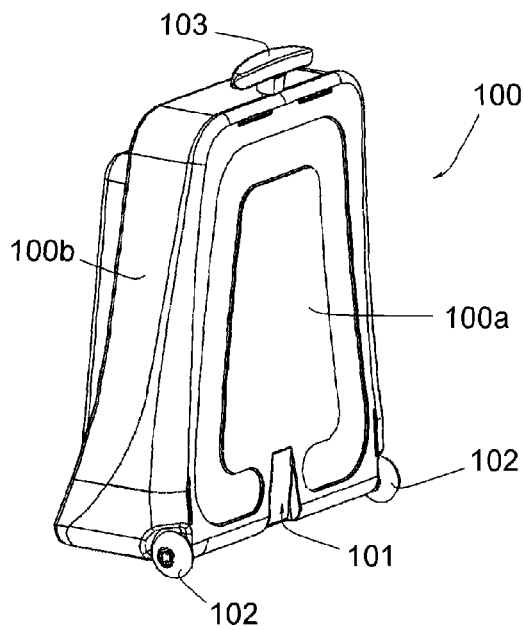
FIG. 10 is a perspective view of a container of the backpack or saddlebag type that may be adapted on the vehicle.
Figure 11:
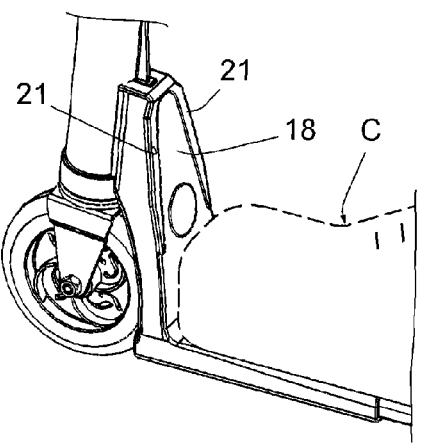
FIG. 11 is a partial perspective view of part of the vehicle serving to mount the container, a user's shoe being shown in broken lines.
Figure 12:
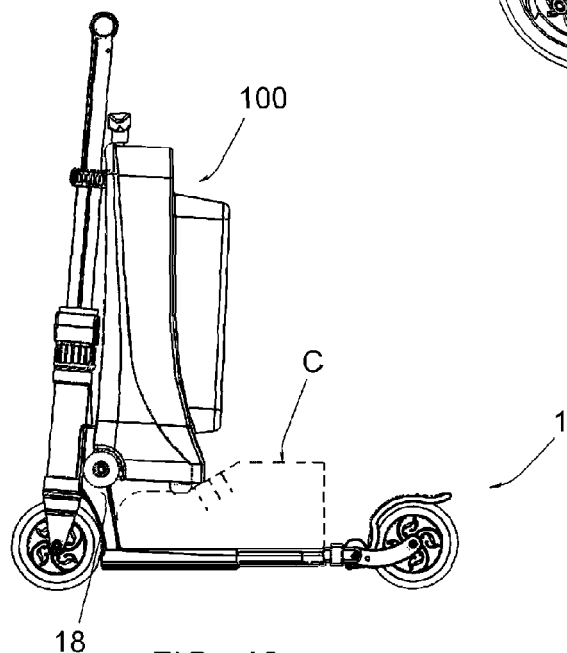
FIG. 12 is a side view of the assembly formed by the vehicle and by the container mounted thereon, also showing the shoe of a user in broken lines.
Figure 13:
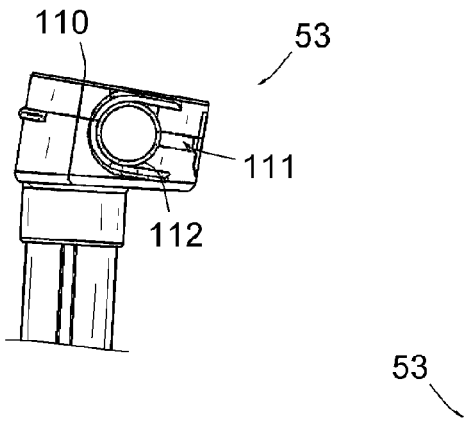
FIGS. 13 to 16 are respectively side, front, top, and rear views of one alternative embodiment of the handlebars, the handles comprised by said handlebars being shown in the deployed position in FIGS. 13 and 14 and in the folded position in FIGS. 15 and 16.
Figure 14:
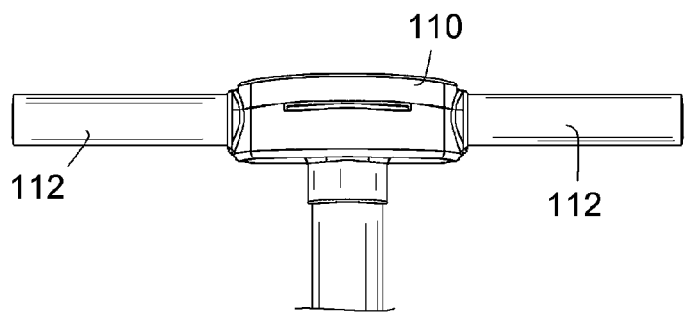
Figure 15:
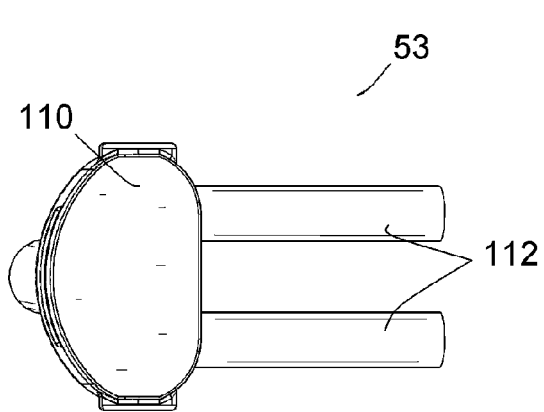
Figure 16:
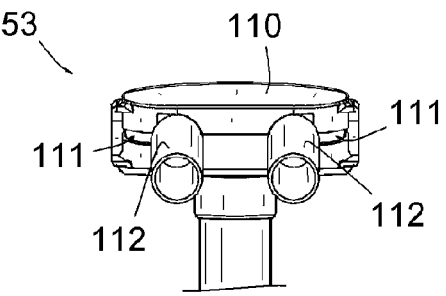

As shown in FIGS. 5 and 11, the foot 18 has a substantially triangular shape and comprises two lateral upper protruding ribs 21. These ribs 21 form a first mounting part allowing the container 100 of the backpack or saddlebag type shown in FIG. 10, which will be described later, to be mounted on the foot 18. This foot 18 has a height such that a shoe C of a user can be engaged between the container 10 and the platform 2, as shown in FIG. 12 and as will be specified again later.

The rear assembly 11, more particularly visible in FIGS. 4 to 6, comprises said rear platform part 17, a block 22 forming a cylinder, and a rear pivoting assembly 23.

The rear part 17 comprises two front extensions 25 (cf. FIG. 4), making it possible to increase the reach of the rear part 17 against the front part 15 in the unfolded position and engaging on either side of the front wheel 4 in the folded position. The rear part 17 also comprises two branches 26 parallel to one another, secured to the rear end thereof, and is closed, in the lower part, by a bottom plate 27.

The locking part 22 is slidingly engaged on the branches 26, owing to lateral openings 28 it comprises to that end. It also comprises two locking cavities 29 emerging on its surface turned toward the rear of the vehicle 1 (cf. FIG. 4A), designed to receive locking extensions 40 of the pivoting rear assembly 23, and two circular cavities 30, emerging in its surface turned toward the front of the vehicle 1 (cf. FIG. 4B), designed to receive springs 31 inserted between the locking part 22 and said rear part of the platform 17. The springs 31 bias the locking part 22 toward a normal rear position, in which said locking extensions 40 can be engaged in an adjusted manner in said locking cavities 29 and can be retained in those cavities. The locking part 22 can, however, slide on the branches 26, toward a position situated on the front side of the vehicle 1, against the elastic force of the springs 31, in which said locking extensions 40 are released from the locking cavities 29.

The locking part 22 lastly comprises median ducts 32 allowing the cable 12 to pass around a pivoting cam 36 comprised by the pivoting rear assembly 23.

The latter essentially comprises two arms 35 pivotably mounted on the two branches 26, the rear wheel 5 mounted between those two branches 35, the aforementioned pivoting cam 36, and a brake 37.

The two arms 35 include said locking extensions 40 on the side of their front ends, beyond their pivot axes. Each of these arms 35 also has a front inner pivot, along which a rib 41 is arranged radially protruding from the pivot (cf. FIG. 4). The ribs 41 of the two arms 35 are designed to be engaged with play in a lumen 42 in the shape of an arc of circle comprised by the pivoting cam 36.

This cam 36 is mounted between the two arms 35, on the same pin 38 as that allowing said arms to be mounted on the branches 26. It comprises a peripheral receiving groove, around it, for the cable 12 (cf. FIG. 3), and comprises a through pin 43 making it possible to immobilize said cable 12 slidingly in relation thereto. As will be understood by comparing FIGS. 2 and 3 or 6, said cam 36 can, during the pivoting thereof, act on the locking part 22 against the elastic force of the springs 31, so as to make the latter go from its aforementioned normal rear position, in which the extensions 40 are engaged in the cavities 29 of the locking part 22, to its aforementioned front position, releasing said extensions 40 in relation to said cavities 29.

The lumen 42 extends over an arc of circle centered on the pivot axis of the cam 36, in the vicinity of 80 degrees, and is angularly delimited by radial end surfaces capable of cooperating with said ribs 41 comprised by the pivots of the arms 35. It is understood that, by the play of said ribs 41 in said lumen 42, the cam 36 is not pivotably connected to the arms 35 on a first sector of its pivoting movement, while the ribs 41 have not encountered the corresponding radial surface of the cam delimiting the lumen 42; this cam 36 is then pivotably connected to the arms 35 over a second sector of its pivoting movement, adjacent to the first sector, when the ribs 41 encounter said corresponding radial surface.

As is also understood, the cam 36 is also configured so as, during its pivoting movement on said first sector, to actuate the locking part 22 from the normal rear position of the said locking part toward the front position thereof, then, during its pivoting movement on said second sector, to pivot the arms 35. The pivoting of the cam 36 on said first sector is therefore a pivoting actuating the locking part 22, while the pivoting of the cam 36 on said second sector is a pivoting that pivots the arms 35.

The brake 37 is traditionally designed to bear directly against the wheel 5. It is pivotably mounted on the arms 35 and is recalled to a position distanced from the wheel 5 using hairpin springs 44 mounted on the pieces 45 forming the pin that makes up the pivot axis of that brake 37.

The steering assembly 3 comprises (cf. FIG. 3) a lower tube 50 pivotably mounted in the tube 19 of the steering extension 16, an upper tube 51 that can be unfolded and folded telescopically relative to said lower tube 50, a handlebar tube 52 that can be manually deployed, handlebars 53, and radial tightening rings 54, making it possible to immobilize the upper tube 51 in relation to the lower tube 50 and the handlebar tube 52 in relation to the upper tube 51.

As shown by FIGS. 2 and 3, the lower tube 50 includes the lower fork 60 for mounting the front wheel 4 and comprises an axial inner mast 61 protruding from its upper end. In reference to FIG. 38, it appears that this mast 61 comprises, at the free end thereof, a locking structure 62 of the "bayonet" type, an axial lug 63 recalled by a spring 64, and, below said structure 62, a pulley 65 with an axis transverse to the mast 61.

The handlebars 53 comprise a stationary part 66 forming a branch of the handlebars and a sliding tube 67 engaged in said stationary part 66, said tube 67 being movable between a folded position in which it is retracted in the stationary part 66 (cf. FIGS. 1 and 2) and an out position in which it forms the second branch of the handlebars 53. The tube 67 is biased toward its out position by a spring and comprises two holes reversibly engaging on the axial lug 63 in said folded and out positions, respectively, said engagements keeping that tube 67 in those positions.

The handlebars 53 also comprise a lower locking structure of the "bayonet" type, complementary to the structure 62. In the position of the handlebars 53 shown in FIGS. 1 and 2, these two locking structures are engaged; in the usage position, in which the branches of the handlebars 53 are parallel to the axis of the wheel 4, the structures are not engaged, freeing the sliding of the tubes 51 and 52 in relation to the tube and, beyond that, freeing the sliding of the rear part 17 of the platform in relation to the front part 15 of said platform.

The rings 54 each comprise two parts, an outer one of which can be screwed in relation to the other, inner part, this screwing making it possible to tighten tabs of the inner part against the tube passing through the ring and thereby lock said tube in relation to the outer tube.

The cable 12 forms a transmission between the front 15 and rear 17 parts of the platform and the tube 51 and actuating means of the pivoting assembly 23 and the pivoting cam 36. To that end, the cable 12 is connected to said front part 15 and comprises a first part extending along the front 15 and rear 17 parts of the platform, then passing through the lower median duct 32 of the locking part 22 (cf. FIGS. 4 to 4B), then passing on a pivoting cam 36 and being fastened thereto by the pin 43 (cf. FIG. 3); a second part of that cable 12 extends, from said fastening point of the cable 12 on the cam 36, through the upper median duct 32 of the locking part 22, then again along the front 15 and rear 17 parts of the platform, then penetrates a sheath connecting the front end of the front part 15 and the fork 60, is engaged on the pulley 65 included by said inner mast 61, then is connected to the lower part of the upper tube 51.

In practice, from the folded position of the vehicle (cf. FIGS. 1 and 2), the handlebars 53 are moved into the usage position, which frees the respective bayonet structures of said handlebars 53 and the mast 61 relative to one another. This release frees the sliding of the rear platform part 17 in relation to the front platform part 15 under the effect of elastic means acting between said two parts 15 and 17. This release also withdraws the lug 63 and frees the sliding of the handlebar tube 67 toward its out position.

The movement of said rear part 17 in relation to said front part 15 toward its unfolded position first exerts a pulling force on said first part of the cable 12, causing the cam 36 to pivot on said first sector, then, once the cam 36 arrives in said second sector, causes the rear pivoting assembly 23 to pivot; once the cam arrives in said second sector, the movement of said rear part 17 also exerts a pulling force on said second part of the cable 12, thereby telescopically folding the tube 51 in relation to the tube 50.

At the end of pivoting of the pivoting rear assembly 23, the extensions 40 of the arms 35 are located across from the cavities 29 of the locking part 22, and the cam 36 frees the sliding of that locking part 22 toward its normal rear position, for locking said extensions 40 in said cavities 29, and therefore locking the arms 35 in the unfolded position.

The tube 52 is then deployed, then the rings 54 are tightened.

Conversely, from the unfolded position of the vehicle 1, after the rings 54 are loosened, the tube 52 is retracted, then pressure is exerted on the tube 51, exerting a pulling force on said second part of the cable; this pulling force causes the cam 36 to pivot on said first sector of the movement of that cam, which actuates the locking part 22 in position before withdrawal, and therefore unlocks the pivoting of the pivoting rear assembly 23, and simultaneously unlocks the movement of said rear part 17 of the platform in the folded position in relation to said front part 15 of the platform.

In reference to FIG. 10, it appears that the container 100 comprises a mounting cavity 101 with a shape corresponding to that of the mounting part formed by the foot 18 and the ribs 21, capable of receiving that mounting part in an adjusted manner, with slight jamming. The container 100 comprises long sides 100a and short sides 100b, and the mounting cavity 101 is arranged at the lower part of one of said long sides 100a, substantially at the center thereof. As shown in FIG. 12, the container 100 can be mounted on the vehicle 1 with its long sides 100a extending transversely to the front-back plane of the vehicle 1, to obtain balanced positioning of the container 100 on said vehicle 1.

It is also visible in this figure, as already shown, that a shoe C of a user can be engaged between the container 100 thus mounted on the platform 2, due to the height of the foot 18 and the height at which the jamming of the foot and the ribs 21 it comprises in the cavity 101 is done.

In the illustrated example, the container 100 also comprises lower castors 102 and a retractable handle 103 (shown in the retracted position in FIG. 10). This handle 103 can be deployed to allow a pulling force of the container 100 when the latter rolls on the ground owing to the castors 102. This container 100 advantageously comprises an inner compartment capable of receiving the vehicle 1 in the folded position.

FIGS. 13 to 19 show an alternative embodiment of the handlebars 53. According to this alternative, the handlebars 53 include a central body 110 forming two lateral slits 111 in a quarter circle on its sides; and two handles 112 pivotably mounted on that central body 110 and movable between the unfolded position shown in FIGS. 13, 14 and 17 and the folded position shown in FIGS. 15, 16 and 19.

The locking member 62 secured to the free end of the mast 61 is, in that case, in the form of a stud with a wide head, forming a shoulder below said head.

Figure 18:
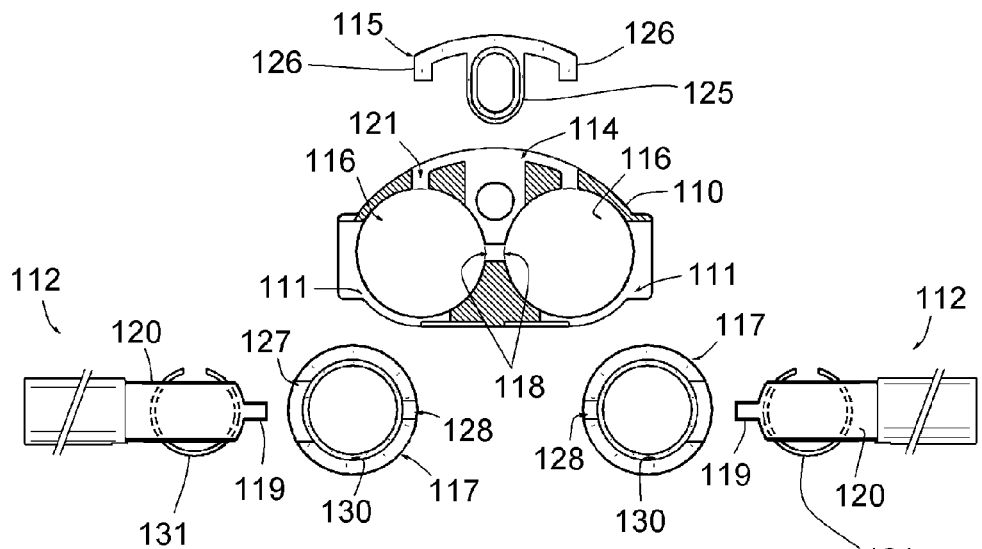
FIG. 18 is a view of the handlebars similar to FIG. 17, exploded.
Figure 19:
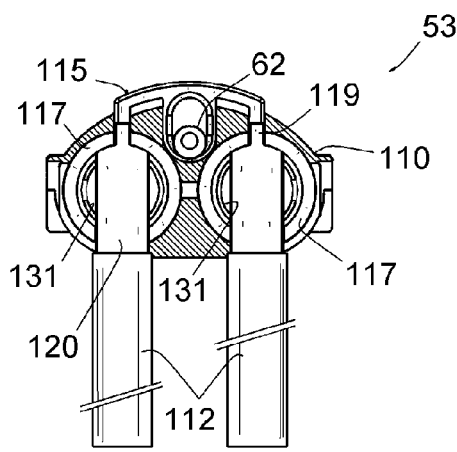
FIG. 19 is a view similar to FIG. 17, the handles being in the folded position.

As particularly shown by FIG. 18, the central body 110 forms a front cavity 114 for receiving and sliding of a pushbutton 115, two rear circular recesses 116, for receiving guide rings 117 for guiding the pivoting of the handles 112, two median housings 118 radially communicating with the circular recesses 116, for receiving locking lugs 119 included by the inner extension 120 of the handles 112, and side ducts 121 putting the front cavity 114 in communication with each of said circular recesses 116.

In the completely folded position of the vehicle 1, the locking member 62 emerges in the median area of the front cavity 114, with a shoulder formed by the head of that member 62 situated above the bottom of that cavity 114.

The pushbutton 115 slides in the front cavity 114 and protrudes from the surface of the body 110 turned toward the front of the vehicle. Said pushbutton 115 comprises a central portion 125 and two lateral extensions 126. The central portion 125 delimits a lumen oriented from front to back, whereof the part turned toward the front side of the vehicle is dimensioned to allow the head of the locking member 62 to pass through it, and whereof the part turned toward the rear side of the vehicle is dimensioned so that the central portion 125 is capable of engaging against the bottom of the head of the locking member 62. Each lateral extension 126 is extended by an actuating finger, oriented parallel to the longitudinal axis of said lumen, which slides in the corresponding duct 121.

Figure 17:
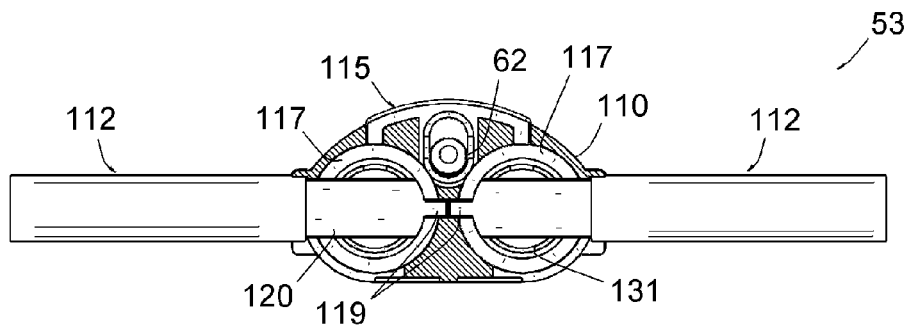
FIG. 17 is a top view of the handlebars, with a longitudinal cross-section of a central body comprised by said handlebars, the handles being in the deployed position.

The pushbutton 115 is normally kept, by elastic means (not shown), in the position shown in FIG. 17, in which its central portion 125 is engaged with the locking member 62 and consequently keeps the entire vehicle in the folded position.

Each ring 117 is received in an adjusted manner, but with the possibility of pivoting, in a corresponding circular recess 116, such that the latter acts as a guide bearing for that pivoting. The ring 117 is, however, interrupted to form two passages 127, 128 through it, one of which allows the sliding engagement of the extension 120 comprised by the corresponding handle 112, and the other of which allows the sliding engagement of the lug 119 of said same extension 120.

Each ring 117 has an inner groove 130 forming a housing for receiving a spring 131 in the shape of an open ring. After mounting, the innermost branch of that spring 131 is, at the base of the lug 119, abutting against the extension 120, while the outermost branch of that spring 131 bears against the ring 117. The spring 131 thus recalls the handle 112 into the sliding position corresponding to the engagement of the lug 119 in the housing 118.

The handle 112 is thus translatable in relation to the corresponding ring 117, between a normal locking position, in which the lug 119 is engaged either in that median housing 118 (cf. FIG. 17) or in the lateral duct 121 (cf. FIG. 19), and an unlocked position, in which said lug 119 is retracted so as to be removed from the median housing 118 or the lateral duct 121 and is therefore located in the perimeter of the ring 117, thus not hindering the pivoting thereof and therefore of the handle 112.

In practice, when the handles are in the folded position (cf. FIG. 19), the lugs 119 are located in the lateral ducts 121; to unfold the vehicle 1, the user pushes on the pushbutton 115, which simultaneously results in making the central portion 125 free the locking member 62 and causing the fingers 126 to extract the lugs 119 from the ducts 121. This extraction frees the pivoting of the ring 117-handle 112 assembly, which is brought into the unfolded position. In this position, the lugs 119 penetrate the housings 118, which locks the handles 112.

To fold the vehicle, the user pulls on the handles 112 so as to extract the lugs 119 outside the housings 118 and brings those handles 112 into the folded position; the return of the lugs 119 into the ducts 121 locks the handles 112 in that position.

The user then pushes on said central body 110 to return the locking member 62 to a position engaged with the pushbutton 115.

As appears from the preceding, the invention provides a vehicle 1 having the decisive advantages of being able to be folded into a small volume and being easy to manipulate. The invention also provides an assembly including this vehicle and a container of the saddlebag or backpack type allowing an advantageous combination of this vehicle and that container.

The invention was described above in reference to one embodiment provided as an example. It is of course not limited to that embodiment, but on the contrary encompasses all other embodiments covered by the appended claims. Thus, the pivoting of each handle 112 could be made automatic, using a torsion spring inserted between the central body 110, at the recess 116, and the inner extension 120 of the handle; such a spring could in particular be helical with one end resting against a bearing surface formed by the body 110, at the wall of that body delimiting the periphery of the recess 116, the other end of the spring resting against a counterpart bearing surface formed by said extension 120.

The invention claimed is:

1. A foldable two-wheel vehicle comprising:
    a platform to position a user, the platform includes a front part and a rear part movable in relation to the front part, said rear part being movable between a collapsed position, in which the rear part is retracted in relation to the front part, and an extended working position;
    a steering assembly including a steering column having a front wheel situated at the front part of the platform, the steering column having a lower part and at least one upper part that is connected telescopically relative to the lower part;
    a rear wheel situated at the rear part of the platform; and
    a transmission located between said front part of the platform and said upper part of the steering column, the transmission is arranged so that extending the rear part of the platform causes the upper part of the steering column to extend and, conversely, retracting the upper part of the steering column causes the rear part of the platform to retract.

2. The vehicle according to claim 1, wherein the rear part of the platform comprises a pivoting rear assembly on which the rear wheel of the vehicle is mounted.

3. The vehicle according to claim 2, wherein the pivoting rear assembly comprises two arms pivotably mounted on two branches secured to said rear part of the platform; the rear wheel is mounted between the two arms on rear ends of the arms, and said arms include locking extensions;

said branches include a locking part slidingly mounted thereon, the branches comprising two cavities capable of receiving said locking extensions in an unfolded position of the pivoting rear assembly, said locking part being biased in a locking position by elastic means; the locking part is longitudinally movable on said branches between the locked position, in which the locking part receives said locking extensions in said cavities, thereby locking the pivoting rear assembly in the unfolded position, and a retracted position, in which the locking part frees said locking extensions of said cavities and thus does not hinder the pivoting of said arms; and the pivoting rear assembly comprises a control member of the locking part, actuated by said transmission.

4. The vehicle according to claim 3, wherein said control member of the locking part is a pivoting cam, not pivotably connected to the arms on a first sector of a pivoting movement of the cam, and pivotably connected to said arms on a second sector of the pivoting movement, said second sector being adjacent to the first sector; the cam is configured so during the pivoting movement on said first sector, the cam moves the locking part from its locking position toward a retracted position, and, during a pivoting movement on said second sector, the cam pivots said arms.

5. The vehicle according to claim 4, wherein said transmission comprises a cable connected to said front part of the platform, a first part of the cable extends along the front part and the rear part of the platform, passes over said pivoting cam and is fixed thereto, and wherein a second part of the cable extends, from the fastening point of the cable on the cam, again along the front part and the rear part of the platform, then penetrates the steering column and is engaged on an upper pulley included by said lower part of said steering column, then is connected to a lower part of said upper part of said steering column; from the collapsed position of the vehicle, the movement of said rear part of the platform in relation to said front part of the platform toward its extended working position first exerts a pulling force on said first part of the cable, causing the cam to pivot on said first sector, then, once the cam arrives in said second sector, causes the rear pivoting assembly to pivot; once the cam arrives in said second sector, the movement of said rear part of the platform also exerts a pulling force on said second part of the cable, thereby performing the telescoping extension of the upper part of the steering column in relation to the lower part thereof.

6. The vehicle according to claim 1, further comprising a manually deployable portion on the steering column, the manually deployable portion is connected to handle bars.

7. The vehicle according to claim 1, further including handlebars having a tube perpendicularly connected to the steering column, said handlebars comprising a stationary part and a moving part, the moving part is unfolded and folded in relation to said stationary part.

8. The vehicle according to claim 1, wherein the rear part is situated in an extension of the front part.

* * * * *